United States Patent
Agapiou et al.

(10) Patent No.: US 11,552,541 B2
(45) Date of Patent: Jan. 10, 2023

(54) INDUCTION MOTOR WITH COLLAR-REINFORCED END RINGS

(71) Applicant: GM GLOBAL TECHNOLOGY OPERATIONS LLC, Detroit, MI (US)

(72) Inventors: John S. Agapiou, Rochester Hills, MI (US); Edwin H. Chang, Detroit, MI (US); Yew Sum Leong, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 81 days.

(21) Appl. No.: 17/151,256

(22) Filed: Jan. 18, 2021

(65) Prior Publication Data
US 2022/0231587 A1    Jul. 21, 2022

(51) Int. Cl.
*H02K 17/16* (2006.01)
*H02K 5/15* (2006.01)
*H02K 9/22* (2006.01)
*H02K 1/2706* (2022.01)

(52) U.S. Cl.
CPC ......... *H02K 17/165* (2013.01); *H02K 1/2706* (2013.01); *H02K 5/15* (2013.01); *H02K 9/22* (2013.01)

(58) Field of Classification Search
CPC .......... H02K 5/15; H02K 17/165; H02K 5/24; H02K 7/04; H02K 7/14; H02K 15/14; H02K 15/0012; H02K 15/02; H02K 15/165; H02K 17/16

USPC ............ 310/51, 125, 211, 216.114, 216.117
See application file for complete search history.

(56) References Cited

U.S. PATENT DOCUMENTS

| | | | | |
|---|---|---|---|---|
| 8,484,828 B2* | 7/2013 | Kleber | ............... | H02K 15/0012 29/598 |
| 9,935,533 B2* | 4/2018 | Ishikawa | ............... | H02K 17/165 |
| 2005/0017597 A1* | 1/2005 | Mays | ....................... | H02K 3/51 310/211 |
| 2022/0320975 A1* | 10/2022 | Büttner | .............. | H02K 15/0012 |

* cited by examiner

*Primary Examiner* — Quyen P Leung
*Assistant Examiner* — Christopher S Leone
(74) *Attorney, Agent, or Firm* — Quinn IP Law

(57) ABSTRACT

An induction motor includes a stator and a rotor. The stator is configured to generate a rotating magnetic field. The rotor is disposed inside the stator, separated from the stator by an air gap, and is configured to rotate around an axis in response to the rotating magnetic field. The rotor includes a rotor core, multiple end rings, and multiple collars. The end rings are attached at opposite ends of the rotor core. Each end ring has one of multiple regions disposed outside the air gap. Each region has an outer surface. The collars are attached in a prestressed condition around the outer surface of each region. The prestressed condition is configured to maintain a compressive stress in the end rings at a maximum-designed rotational speed of the rotor.

20 Claims, 5 Drawing Sheets

INDUCTION MOTOR WITH COLLAR-REINFORCED END RINGS

INTRODUCTION

The present disclosure relates to a system and a method for induction motors with collar-reinforced end rings.

Die-cast induction motors have rotors turning inside stators. The rotors include multiple laminations having slots bracketed by end rings. Conductors fill the slots to create a cage configuration. Such cage-induction machines have widespread use in industrial applications. At high operational speeds, the rotor end rings may deform due to centrifugal stresses in the end rings. The deformation may cause the end rings to expand, potentially resulting in cracks. In severe situations, the expansion may result in the end rings contacting an inner wall of the stator.

What is desired is design, a technique for manufacturing and/or operating inductor motors with collar-reinforced the end rings.

SUMMARY

An induction motor is provided herein. The induction motor includes a stator and a rotor. The stator is configured to generate a rotating magnetic field. The rotor is disposed inside the stator, separated from the stator by an air gap, and configured to rotate around an axis in response to the rotating magnetic field. The rotor includes a rotor core. a plurality of end rings and a plurality of collars. The plurality of end rings are attached at opposite ends of the rotor core. Each of the plurality of end rings has one of a plurality of regions disposed outside the air gap. Each of the plurality of regions has an outer surface. The plurality of collars are attached in a prestressed condition around the outer surface of each of the plurality of regions. The prestressed condition is configured to maintain a compressive stress in the plurality of end rings at a maximum-designed rotational speed of the rotor.

In one or more embodiments of the induction motor, the rotor includes a plurality of conductors disposed within the rotor core and connected to the plurality of end rings. The plurality of conductors applies a centrifugal force to the plurality of end rings while the rotor is rotating.

In one or more embodiments of the induction motor, the plurality of collars are configured to maintain the outer surface of each of the plurality of end rings at a constant outer diameter while the rotor is rotating by containing the centrifugal force of the plurality of conductors.

In one or more embodiments of the induction motor, the plurality of conductors is fabricated from copper, the plurality of end rings is fabricated from aluminum, and the plurality of collars is fabricated from stainless steel.

In one or more embodiments of the induction motor, the plurality of conductors and the plurality of end rings are fabricated from copper, and the plurality of collars is fabricated from stainless steel.

In one or more embodiments of the induction motor, the plurality of collars reduces a tensile stresses in the plurality of end rings to sustain a hoop stress in the plurality of end rings while the rotor is rotating.

In one or more embodiments of the induction motor, each of the plurality of collars has an interference fit with a corresponding one of the plurality of end rings to establish the prestressed condition.

In one or more embodiments of the induction motor, the interference fit is a press fit or a shrink fit.

In one or more embodiments, the induction motor, is part of a vehicle.

A method for operating an induction motor is provided herein. The method includes generating a rotating magnetic field with a stator, and rotating a rotor around an axis in response to the rotating magnetic field. The rotor is disposed in an interior of the stator and is separated from the stator by an air gap. The rotor includes a rotor core, a plurality of end rings attached at opposite ends of the rotor core, wherein each of the plurality of end rings has one of a plurality of regions disposed outside the air gap, and each of the plurality of regions has an outer surface, and a plurality of collars attached in a prestressed condition around the outer surface of each region of the plurality of end rings. The method further includes maintaining a compressive stress in the plurality of end rings at a maximum-designed rotational speed of the rotor with the plurality of collars.

In one or more embodiments of the method, the rotor includes a plurality of conductors disposed within the rotor core and connected to the plurality of end rings. The method further includes applying a centrifugal force with the plurality of conductors to the plurality of end rings while the rotor is rotating.

In one or more embodiments, the method includes maintaining the outer surface of each of the plurality of end rings at a constant outer diameter while the rotor is rotating by containing the centrifugal force of the plurality of conductors with the plurality of collars.

In one or more embodiments, the method includes reducing a tensile stresses in the plurality of end rings while the rotor is rotating using the plurality of collars to sustain a hoop stress in the plurality of end rings.

In one or more embodiments of the method, the induction motor is part of a vehicle.

A method for fabricating an induction motor is provided herein. The method includes attaching a plurality of end rings at opposite ends of a rotor core of a rotor. Each of the plurality of end rings has one of a plurality of regions. Each of the plurality of regions has an outer surface. The method includes inserting the rotor inside a stator and separated from the stator by an air gap such that each of the plurality of regions is disposed outside of the air gap. The stator is configured to generate a rotating magnetic field. The rotor is rotatable around an axis in response to the rotating magnetic field. The method further includes attaching a plurality of collars in a prestressed condition around the outer surface of each of the plurality of regions. The prestressed condition is configured to maintain a compressive stress in the plurality of end rings at a maximum-designed rotational speed of the rotor.

In one or more embodiments, the method includes disposing plurality of conductors within the rotor core, and connecting the plurality of conductors to the plurality of end rings. The plurality of conductors applies a centrifugal force to the plurality of end rings while the rotor is rotating.

In one or more embodiments, the method includes creating the prestressed condition by interference fitting the plurality of collars to the plurality of end rings.

In one or more embodiments of the method, the interference fitting is a press fitting of the plurality of collars around the plurality of end rings.

In one or more embodiments of the method, the interference fitting includes heating the plurality of collars, positioning the plurality of collars around the plurality of end rings, and cooling the plurality of collars.

In one or more embodiments of the method, the interference fitting includes cooling the plurality of end rings, positioning the plurality of collars around the plurality of end rings, and warming the plurality of collars.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a design, method of operation, and a method for manufacturing an induction motor that utilizes thin-wall collars around an outer diameter of the end rings of the rotor. The collars on the outer diameter support high centrifugal forces and stresses at high rotational speeds (e.g., >12,000 revolutions per minute). The centrifugal forces are generated by the rotor conductors and internal mass of the end rings. In various embodiments, the conductors are copper bars overcast by aluminum end rings. The collars may be fabricated from stainless steel and subsequently press fit or heat-shrink fit on the end rings. The stainless steel collars allow the use of the high electrical conductivity pure aluminum or pure copper within high speed hybrid rotors.

A maximum rotational speed of die-cast hybrid induction rotors is improved by incorporating the thin-walled collars on the outside diameter of the end rings. The collars enable the end rings to contain higher hoop stresses and centrifugal forces than existing designs based on low strength materials. For example, pure aluminum or pure copper end rings alone are prone to distortion by the large rotational stresses caused by the high circumferential velocity of the rotor. The stresses may be larger in hybrid rotors due to an inertia of copper-bar type conductors incorporated in the rotors. The thin-walled collars for hybrid induction rotors allow the rotors to achieve higher rotational speeds specified for electric vehicles. The implementation of induction motors in the electric vehicles also reduces a dependency on permanent magnet motors. The hoop stresses are forces exerted circumferentially (perpendicular to an axis of rotation) in both directions on pieces of a cylinder.

Figure 1:
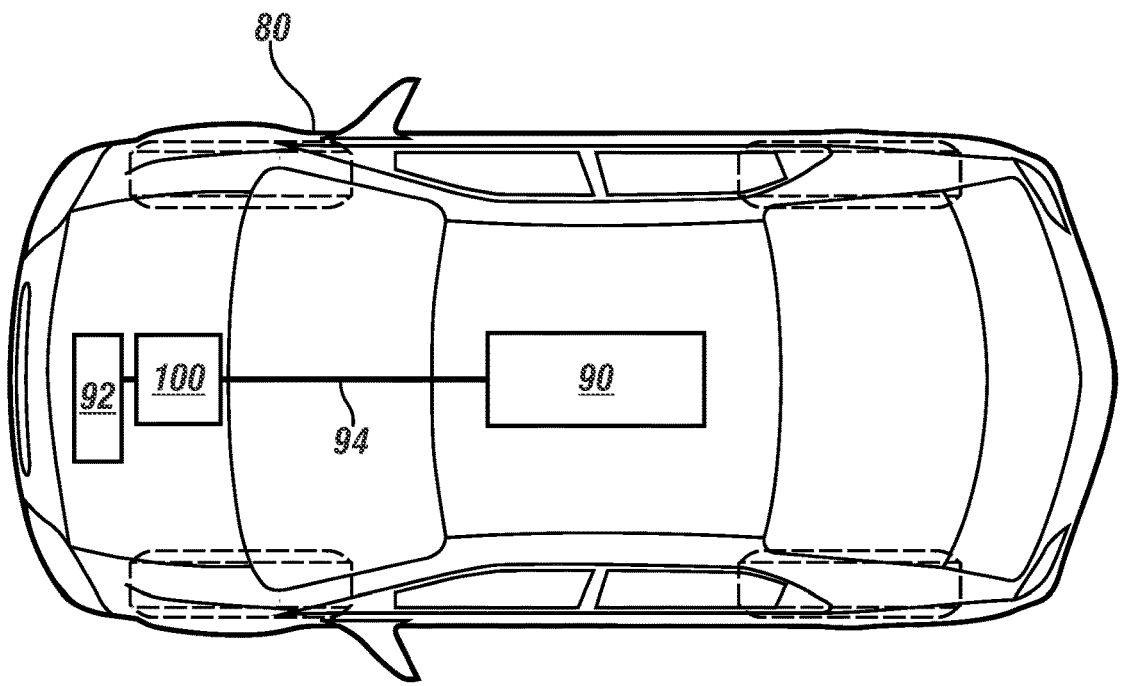
FIG. 1 is a schematic plan diagram illustrating a context of a vehicle in accordance with one or more exemplary embodiments.

Referring to FIG. 1, a schematic plan diagram illustrating a context of a vehicle 80 is shown in accordance with one or more exemplary embodiments. The vehicle 80 generally includes a rechargeable energy storage system 90, a transmission 92, a harness 94, and an induction motor 100.

The vehicle 80 implements an electric motor-based machine. The vehicle 80 may include, but is not limited to, mobile objects such as automobiles (e.g., an electric vehicle or a hybrid vehicle), trucks, motorcycles, boats, trains and/or aircraft. In some embodiments, the vehicle 80 may include stationary objects such as power back-up systems and/or industrial machinery. Other types of vehicles 80 may be implemented to meet the design criteria of a particular application.

The rechargeable energy storage system 90 implements a battery pack. The rechargeable energy storage system 90 is generally operational to store energy used by the induction motor 100. In a charging mode, the rechargeable energy storage system 90 may receive electrical current from a generator and/or external source. In a discharging mode, the rechargeable energy storage system 90 may provide electrical current to the induction motor 100. The rechargeable energy storage system 90 may include multiple battery modules electrically connected in series and/or in parallel between a positive battery pack terminal and a negative battery pack terminal. In various embodiments, the rechargeable energy storage system 90 may provide approximately 200 to 1,000 volts DC (direct current) electrical potential between the positive battery pack terminal and the negative battery pack terminal. Other battery voltages may be implemented to meet the design criteria of a particular application. The rechargeable energy storage system 90 may be physically and electrically connected to the harness 94.

The transmission 92 implements a torque control mechanism. The transmission 92 is generally operational to transfer mechanical torque from the induction motor 100 to the wheels of the vehicle 80. In various embodiments, the transmission 92 may implement a geared transmission. In other embodiments, the transmission 92 may implement a continuously variable transmission.

The harness 94 implements an electrical harness. The harness 94 is generally operational to carry electrical power between the rechargeable energy storage system 90 and the induction motor 100. In operation, the electrical power may flow along the harness 94 from the rechargeable energy storage system 90 to the induction motor 100.

The induction motor 100 implements a drive motor for the vehicle 80. The induction motor 100 is generally operational to provide rotation and torque to drive the wheels of the vehicle 80. The electrical power consumed by the induction motor 100 may be provided by the rechargeable energy storage system 90. The induction motor 100 generally has a stator and a rotor. The rotor may be disposed within the stator, and separated from the stator by an air gap.

Figure 2:
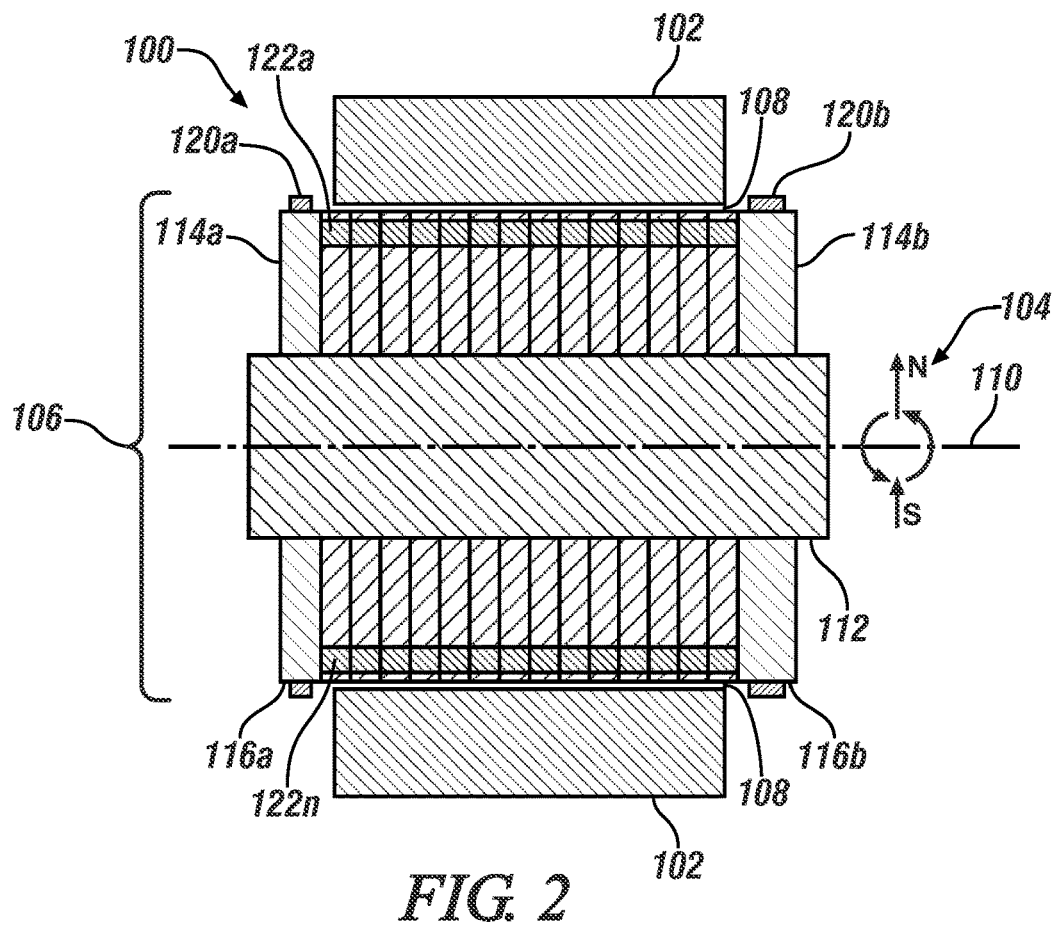
FIG. 2 is a schematic cross-sectional diagram of an induction motor in accordance with one or more exemplary embodiments.

Referring to FIG. 2, a schematic cross-sectional diagram of an example implementation of the induction motor 100 is shown in accordance with one or more exemplary embodiments. The induction motor 100 generally includes a stator 102 and a rotor 106.

The stator 102 implements an induction motor stator. The stator 102 is generally operational to cause the rotor 106 to rotate. The stator 102 may include multiple windings and multiple laminations extending inward toward the rotor 106. Multi-phase alternating currents driven through the windings generally establish the rotating magnetic field 104. An inner diameter of the stator 102 and an outer diameter of the rotor 106 are separated by an air gap 108.

The rotating magnetic field 104 is generated by the stator 102. The rotating magnetic field 104 rotates around an axis 110 at a synchronous speed (e.g., Ns). The synchronous speed Ns is variable by changing a frequency of the alternating currents.

The rotor 106 implements an induction motor rotor. The rotor 106 is disposed in an interior of the stator 102. The rotor 106 may include a rotor core 112, multiple end rings 114a-114b, multiple collars 120a-120b, and multiple conductors 122a-122n. The rotor 106 is generally operational to convert the rotating magnetic field 104 into mechanical motion around the axis 110. The rotor 106 turns at a rotor speed (e.g., Nr) that is less than the synchronous speed Ns. The rotor 106 generally has a maximum-designed rotational speed (e.g., $\omega_{max}$) at which the rotor 106 can operate without self-inducted damage.

The air gap 108 may provide a physical gap between an inside surface of the stator 102 and an outside surface of the rotor 106. A size of the air gap 108 between the stator 102 and the rotor 106 may be less than a millimeter (mm). In some embodiments, the size of the air gap 108 may be less than 0.5 mm (e.g., 0.2 mm to 0.45 mm). Other sizes of the air gap 108 may be implemented to meet the design criteria of a particular design.

The rotor core 112 implements a central portion of the rotor 106. The rotor core 112 is operational to rotate around the axis 110 at the rotor speed Ns. The rotor core 112 may transfer the mechanical torque generated by the rotor 106 to the transmission 92.

The end rings 114a-114b implement electrical connections attached at opposite ends of the rotor core 112. The end rings 114a-114b are connected the conductors 122a-122n physically and electrically at opposite longitudinal ends of the conductors 122a-122n. The end ring 114a-114b have respective regions 116a-116b disposed outside the air gap 108. Each region 116a-116b has an outer surface 118a-118b. The end rings 114a-114b are generally cast over the outer ends of the conductors 122a-122n. In various embodiments, the end rings 114a-114b are fabricated from aluminum or copper. Other material may be used to meet the design criteria of a particular application.

The collars 120a-120b implement thin-walled compression rings. The collars 120a-120b are attached in a prestressed condition around the respective outer surfaces 118a-118b within the regions 116a-116b of the end rings 114a-114b. The prestressed condition is configured to maintain a compressive stress in the end ring 114a-114b at the maximum-designed rotational speed $\omega_{max}$ of the rotor 106. The prestressed condition may be achieved by an interference fit of the collars 120a-120b onto the end rings 114a-114b.

The conductors 122a-122n implement electrical conductors. The conductors 122a-122n are disposed within the rotor core 112 around an outer circumference of the rotor core 112. The conductors 122a-122n are physically and electrically connected to the end rings 114a-114b. The rotating magnetic field 104 is configured to induce currents in the end rings 114a-114b and the conductors 122a-122n as the rotating magnetic field 104 cuts through the conductors 122a-122n. The induced currents case the rotor 106 to rotate. While rotating, the conductors 122a-122n apply a centrifugal force to the end rings 114a-114b.

Figure 3:
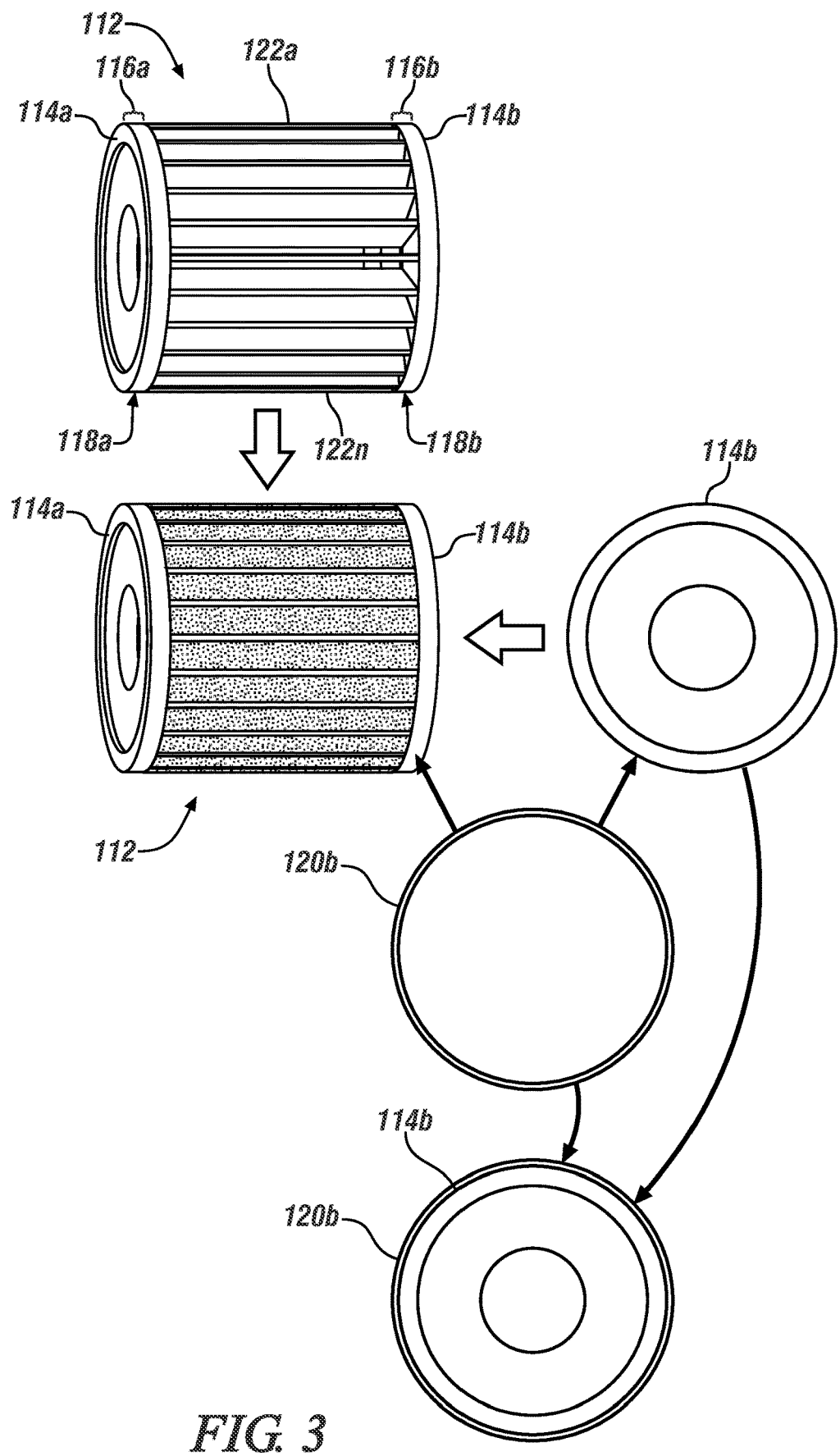
FIG. 3 is a schematic partially exploded perspective diagram of a rotor in accordance with one or more exemplary embodiments.

Referring to FIG. 3, a schematic partially exploded perspective diagram of an example implementation of the rotor 106 is shown in accordance with one or more exemplary embodiments. The rotor core 112 includes the conductors 122a-122n disposed between the end rings 114a-114b. The first end ring 114a has a first region 116a on a first outer surface 118a. The second end ring 114b has a second region 116b on a second outer surface 118b. A second collar 120b is disposed around the second outer surface 118b of the second end ring 114b within the second region 116b. Likewise, a first collar 120a (see FIG. 2) is disposed around the first outer surface 118a of the first end ring 114a within the first region 116a.

The collars 120a-120b are shrink-fitted (or press-fitted) on the end rings 114a-114b of a die-cast hybrid rotor 106 to improve a rotational performance of the induction motor 100. The die-cast hybrid rotor 106 may be an aluminum rotor or a copper rotor. The collars 120a-120b may be high strength stainless steel collars.

The collars 120a-120b are installed on the end rings 114a-114b in a prestressed condition to permit the rotor 106 to run at high speeds. The collars 120a-120b provides an ability for low-strength pure aluminum material or low-strength pure copper material end rings 114a-114b to resist the applied centrifugal loads at the specified high rotational speeds. The high strength stainless steel collars 120a-120b are shrink-fitted and/or press-fitted over the end rings 114a-114b to induce compressive stresses that overcome the centrifugal tensile stresses on the aluminum die-cast or the copper die-cast end rings 114a-114b, especially the forces created by the conductors 122a-122n that form the multi-material cage configuration.

Figure 4:
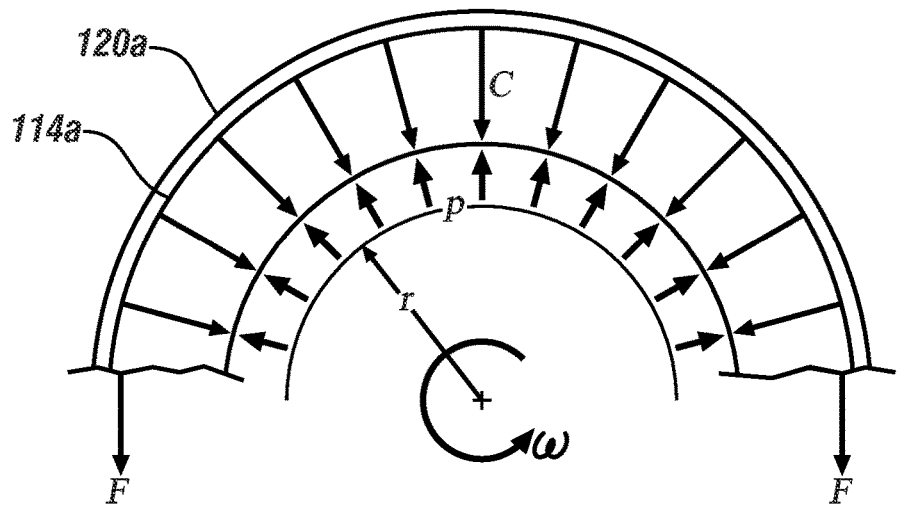
FIG. 4 is a schematic cross-sectional diagram of a portion of an end ring in accordance with one or more exemplary embodiments.

Referring to FIG. 4, a schematic cross-sectional diagram of an example portion of the first end ring 114a is shown in accordance with one or more exemplary embodiments. A portion of the first collar 120a is shown mounted on the first end ring 114a.

The end rings 114a-114b are rotating with an angular velocity (w) and are subjected to a radial pressure (e.g., centrifugal force P) caused by the centrifugal effect of the conductors 122a-122n in the lamination slots and the rotating mass of the end rings 114a-114b at a sample radius (e.g., r). A hoop tension force (e.g., F) set up due to the rotation. The collars 120a-120b apply a compressive pressure (e.g., C) against the radial pressure P and the hoop tension force F to prevent the end rings 114a-114b from expanding.

Figure 5:
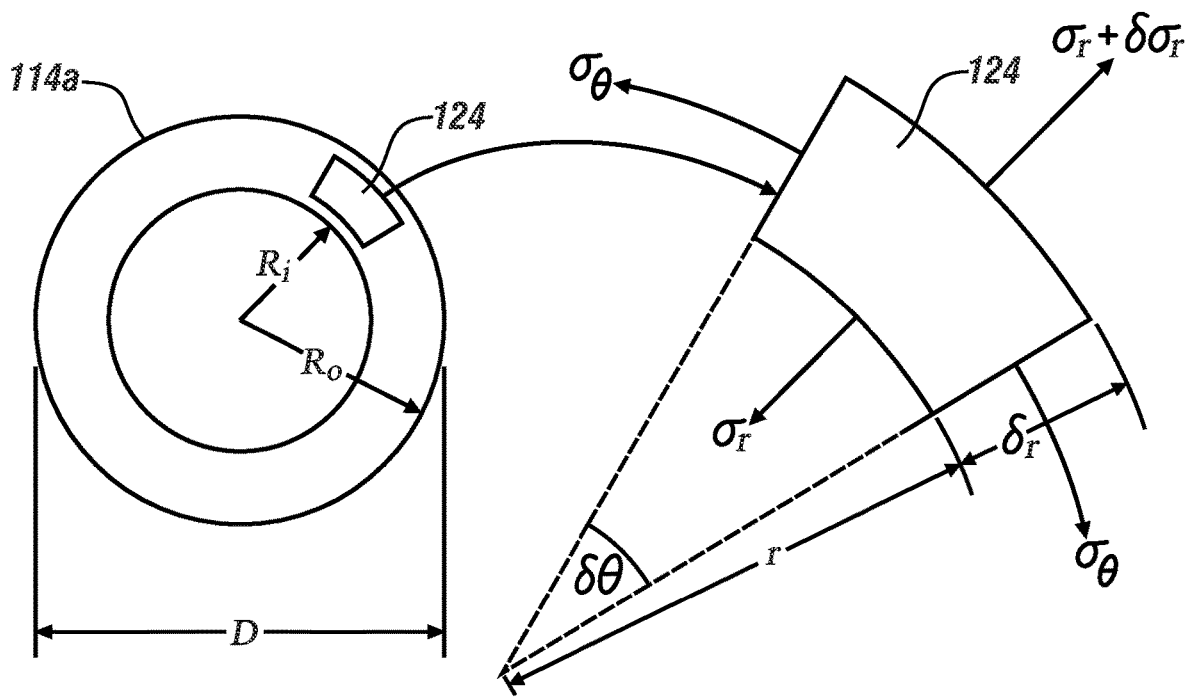
FIG. 5 is a schematic enlarged partial cross-sectional diagram of a sample from the end ring in accordance with one or more exemplary embodiments.

Referring to FIG. 5, a schematic enlarged partial cross-sectional diagram of an example sample 124 from the first end ring 114a is shown in accordance with one or more exemplary embodiments. The first end ring 114a has an inner radius (e.g., Ri), an outer radius (e.g., Ro), and a constant outer diameter (e.g., D). The sample 124 of the end ring 114a at the sample radius r between the inner radius Ri and the outer radius Ro may be considered. The sample 124 generally has a sample radial thickness (e.g., δr) and a sample angular width (e.g., δθ).

Radial stresses (e.g., $\sigma_r$ and $\sigma_r + \delta\sigma_r$) and tangential stresses ($\sigma_\theta$) (inertia stresses) affect the deformation of the first end ring 114a made of either low strength pure aluminum material or low strength pure copper material. A deformation occurs if there is a change in the inner radius Ri and/or the outer radius Ro of the first end ring 114a while rotating at a uniform angular velocity. The deformation generally leads to cracking and separation of small pieces from the first end ring 114a. A similar condition exists for the second end ring 114b. Therefore, the collars 120a-120b are utilized to prevent the deformations and so maintain the integrity of the end rings 114a-114b.

Figure 6:
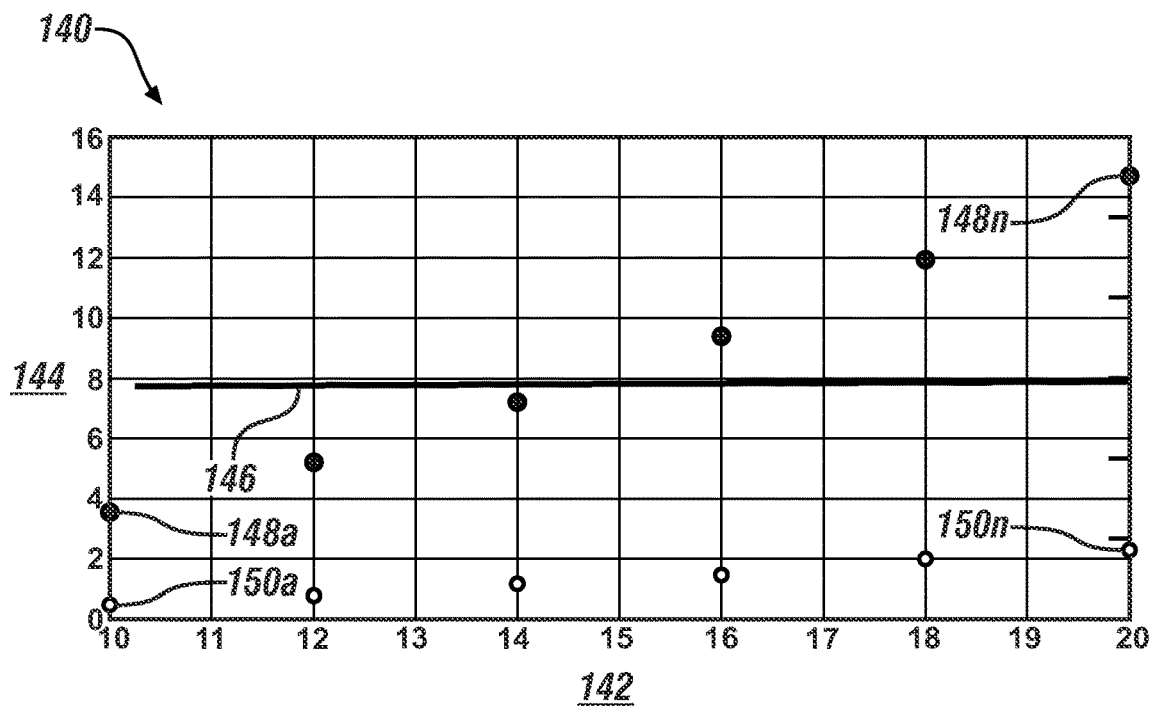
FIG. 6 is a graph of radial pressure estimations at the inner diameter of an end ring on the rotor in accordance with one or more exemplary embodiments.

Referring to FIG. 6, a graph 140 of an example radial pressure estimations at the inner diameter of an end ring (e.g., 114a) on a rotor 106 is shown in accordance with one or more exemplary embodiments. The axis 142 of the graph 140 shows a rotational speed in thousands of revolutions per minute. The axis 144 of the graph 140 shows a radial pressure in mega-Pascals (MPa). A line 146 illustrates a yield strength of pure aluminum. The yield strength line 146 is slightly less than 8 MPa.

Estimated pressure for an end ring 114a without a collar are shown as typical pressure points 148a-148n. The typical pressure points 148a-148n may indicate that the inner pressure in the end ring 114a is equal to or greater than half the material's yield strength at rotational speeds of greater than 10,000 revolutions per minute. The typical pressure points 148a-148n also indicate that the radial pressure exceeds the yield strength of pure aluminum around approximately 14,200 revolutions per minute. Estimated pressure for an end ring 114a with the collar 120a installed are shown as improved pressure points 150a-150n. The improved pressure points 150a-150n may indicate that the radial pressure in the end ring 114a remains well below the yield strength of the pure aluminum up to and above 20,000 revolutions per minute.

Figure 7:
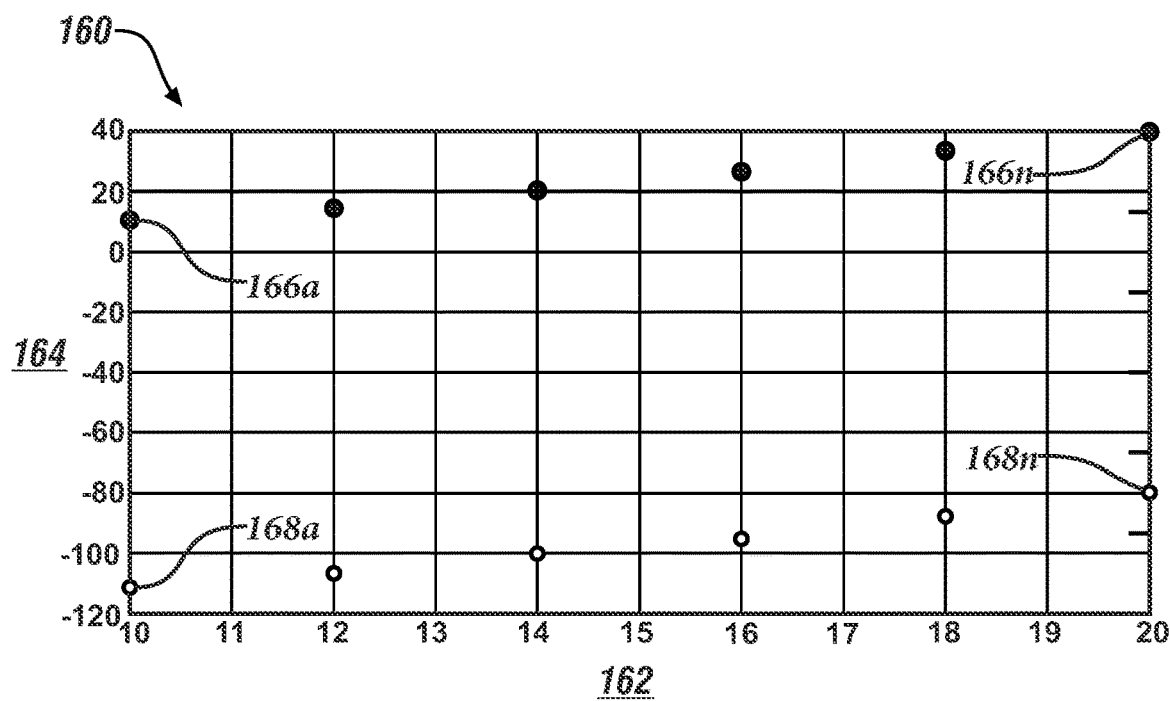
FIG. 7 is a graph of hoop stress estimations on the rotor in accordance with one or more exemplary embodiments.

Referring to FIG. 7, a graph 160 of an example hoop stress estimations on a rotor 106 is shown in accordance with one or more exemplary embodiments. The axis 162 of the graph 160 shows a rotational speed in thousands of revolutions per minute. The axis 164 of the graph 160 shows a hoop stress in mega-Pascals (MPa).

Estimated hoop stress for an end ring (e.g., 114a) without a collar are shown as typical stress points 166a-166n. The typical stress points 166a-166n may indicate that the end ring 114a experiences a positive (expansive) hoop stress at rotational speeds of greater than 10,000 revolutions per minute. Estimated hoop stress for an end ring 114a with the collar 120a installed are shown as improved stress points 168a-168n. The improved stress points 168a-168n may indicate that the end ring 114a experiences a negative (compressive) hoop stress at rotational speeds up to and above 20,000 revolutions per minute. The collar installed in a prestressed condition permits the end ring of the rotor to run at higher rotational speeds than an end ring without the collar.

Figure 8:
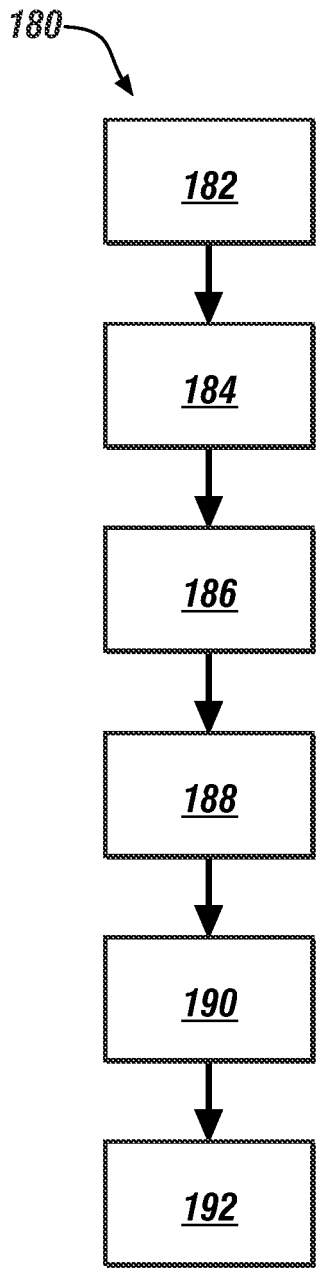
FIG. 8 is a flow diagram of method of operation in accordance with one or more exemplary embodiments.

Referring to FIG. 8, a flow diagram of an example method of operation 180 is shown in accordance with one or more exemplary embodiments. The method (or process) of operation 180 is performed by the induction motor 100. The method 180 includes a step 182, a step 184, a step 186, a step 188, a step 190, and a step 192. The sequence of steps is shown as a representative example. Other step orders may be implemented to meet the criteria of a particular application.

In the step 182, the stator 102 generates the rotating magnetic field 104. The rotating magnetic field 104 causes the rotor 106 to rotate around the axis 110 in the step 184. The rotation of the end rings 114a-114b and the conductors 122a-122n apply a centrifugal force to the end rings 114a-114b and the collars 120a-120b in the step 186.

In the step 188, the high-strength collars 120a-120b maintain a compressive stress in the regions 116a-116b of the low-strength end rings 114a-114b at a maximum-designed rotational speed of the rotor 106. The collars 120a-120b also maintain the outer surface 118a-118b of the end rings 114a-114b at the constant diameter D in the step 190. In the step 192, the collars 120a-120b reduce a tensile stress in the end rings 114a-114b to sustain the hoop stress in the end rings 114a-114b. Generally, the steps 188, 190, and 192 are performed simultaneously.

Figure 9:
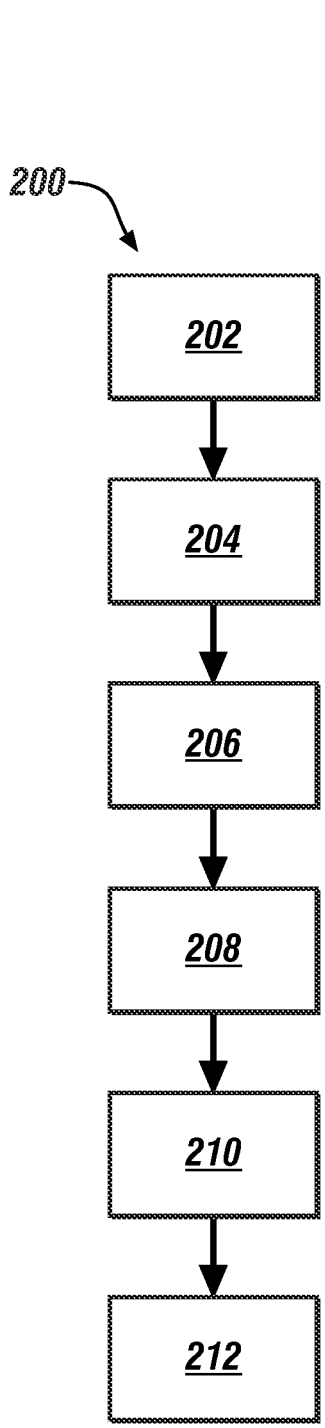
FIG. 9 is a flow diagram of a method for fabricating the induction motor in accordance with one or more exemplary embodiments.

Referring to FIG. 9, a flow diagram of an example method for fabricating 200 the induction motor 100 is shown in accordance with one or more exemplary embodiments. The method (or process) for fabricating 200 may be performed using existing motor fabrication tools. The method for fabricating 200 includes a step 202, a step 204, a step 206, a step 208, a step 210, and a step 212. The sequence of steps is shown as a representative example. Other step orders may be implemented to meet the criteria of a particular application.

In the step 202, the laminations may be attached to the rotor core 112. The conductors 122a-122n may be disposed in the slots of the laminations within the rotor core 112 in the step 204. The end rings 114a-114b are attached to the conductors 122a-122n at opposite ends of a rotor core 112 of a rotor 106 in the step 206. Each end ring 114a-114b has a respective region 116a-116b. Each region 116a-116b has a respective outer surface 118a-118b.

In the step 208, the rotor 106 is inserted inside the stator 102 and separated from the stator 102 by the air gap 108 such that at least a portion of each region 116a-116b is disposed outside the air gap 108. The collars 120a-120b are attached in a prestressed condition around the outer surface 118a-118b of each region 116a-116b in the step 210. The prestressed condition is configured to maintain a compressive stress in the end rings 114a-114b at the maximum-designed rotational speed of the rotor 106. The prestress condition is achieved by interference fitting the collars 120a-120b to the end rings 114a-114b. After the interference fitting, a diameter of the collars 120a-120b is slightly increased from a relaxed diameter (e.g., Dcollar) and a diameter of the end rings 114a-114b is slightly decreased from a relaxed diameter (e.g., Dend-ring). An assembled diameter (e.g., Dassemb) at an interface between the collars 120a-120b and the end rings 114a-114b may be greater than the relaxed diameter of the collars 120a-120b and less than the relaxed diameter of the end rings 114a-114b (Dcollar<Dassemb<Dend-ring). End shields may be attached in the step 212 to provide protective covers over the opposite ends of the rotor 106.

Figure 10:
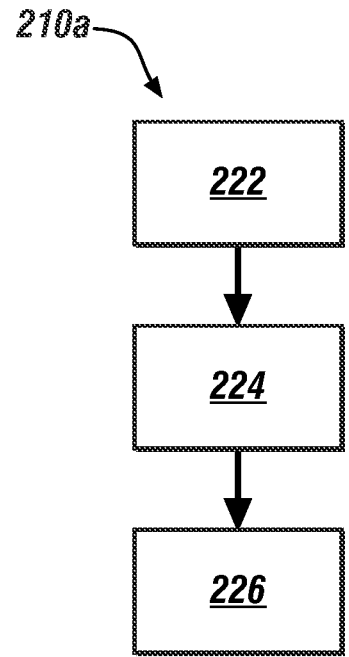
FIG. 10 is a flow diagram of a method to attach the collars on the end rings in accordance with one or more exemplary embodiments.

Referring to FIG. 10, a flow diagram of an example step 210a to attach the collars 120a-120b on the end rings 114a-114b is shown in accordance with one or more exemplary embodiments. The step 210a may be a variation of the step 210 to interference fit the collars 120a-120b by shrink fitting the collars 120a-120b. The step (or process) 210a may be performed with normal induction motor fabrication tools. The step 210a includes a step 222, a step 224, and a step 226.

In the step 222, the collars 120a-120b may be heated to expand an inside radius. The expanded collars 120a-120b are positioned in the step 224 around the end rings 114a-114b at the regions 116a-116b. In the step 226, the collars 120a-120b are cooled. The cooling generally causes the inside radius of the collars 120a-120b to contract and establish the prestress condition on the end rings 114a-114b.

Figure 11:
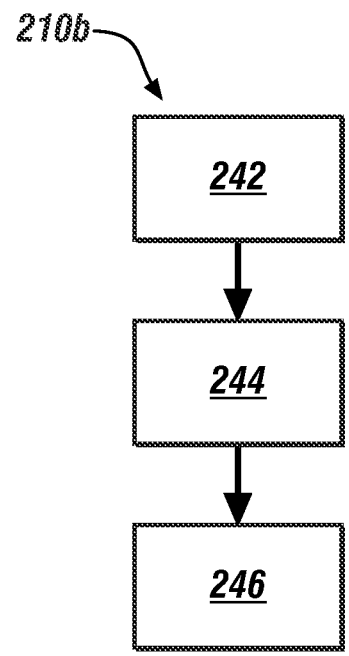
FIG. 11 is a flow diagram of another method to attach the collars on the end rings in accordance with one or more exemplary embodiments.

Referring to FIG. 11, a flow diagram of an example step 210b to attach the collars 120a-120b on the end rings 114a-114b is shown in accordance with one or more exemplary embodiments. The step 210b may be a variation of the step 210 to interference fit the collars 120a-120b by shrink fitting the end rings 114a-114b. The step (or process) 210b may be performed with normal induction motor fabrication tools. The step 210b includes a step 242, a step 244, and a step 246.

In the step 242, the rotor 106 is cooled to reduce the outer radius of the end rings 114a-114b. The collars 120a-120b are positioned in the step 244 around the end rings 114a-114b at the regions 116a-116b. In the step 246, the rotor 106 is warmed to expand the outer radius of the end rings 114a-114b. The warming generally causes the outer diameter of the end rings 114a-114b to expand and establish the pre-stress condition on the collars 120a-120b. In various embodiments, the interference fitting may be achieved with combinations of press-fitting the collars 120a-120b to the end rings 114a-114b, heating the collars 120a-120b for shrink fitting and/or cooling the end rings 114a-114b for shrink fitting.

While the best modes for carrying out the disclosure have been described in detail, those familiar with the art to which this disclosure relates will recognize various alternative designs and embodiments for practicing the disclosure within the scope of the appended claims.

What is claimed is:

1. An induction motor comprising:
   a stator configured to generate a rotating magnetic field; and
   a rotor disposed inside the stator, separated from the stator by an air gap, and configured to rotate around an axis in response to the rotating magnetic field, the rotor includes:
   a rotor core;
   a plurality of end rings attached at opposite ends of the rotor core, wherein each of the plurality of end rings has one of a plurality of regions disposed outside the air gap, each of the plurality of regions has an outer surface, and the outer surface is aligned with an inner diameter of the air gap; and
   a plurality of collars attached in a prestressed condition around the outer surface of each of the plurality of regions outside the air gap, wherein the prestressed condition is configured to maintain a compressive stress in the plurality of end rings at a maximum-designed rotational speed of the rotor, and the plurality of collars radially extends beyond an outer diameter of the air gap.

2. The induction motor according to claim 1, wherein the rotor further comprises a plurality of conductors disposed within the rotor core and connected to the plurality of end rings, wherein the plurality of conductors applies a centrifugal force to the plurality of end rings while the rotor is rotating.

3. The induction motor according to claim 2, wherein the plurality of collars are configured to maintain the outer surface of each of the plurality of end rings at a constant outer diameter while the rotor is rotating by containing the centrifugal force of the plurality of conductors.

4. The induction motor according to claim 2, wherein the plurality of conductors is fabricated from copper, the plurality of end rings is fabricated from aluminum, and the plurality of collars is fabricated from stainless steel.

5. The induction motor according to claim 2, wherein the plurality of conductors and the plurality of end rings are fabricated from copper, and the plurality of collars is fabricated from stainless steel.

6. The induction motor according to claim 1, wherein the plurality of collars reduces a tensile stress in the plurality of end rings to sustain a hoop stress in the plurality of end rings while the rotor is rotating.

7. The induction motor according to claim 1, wherein each of the plurality of collars has an interference fit with a corresponding one of the plurality of end rings to establish the prestressed condition.

8. The induction motor according to claim 7, wherein the interference fit is a press fit or a shrink fit.

9. The induction motor according to claim 1, wherein the induction motor is part of a vehicle.

10. A method for operating an induction motor comprising:
    generating a rotating magnetic field with a stator;
    rotating a rotor around an axis in response to the rotating magnetic field, wherein the rotor is disposed in an interior of the stator and is separated from the stator by an air gap, the rotor includes:
    a rotor core;
    a plurality of end rings attached at opposite ends of the rotor core, wherein each of the plurality of end rings has one of a plurality of regions disposed outside the air gap, each of the plurality of regions has an outer surface, and the outer surface is aligned with an inner diameter of the air gap; and
    a plurality of collars attached in a prestressed condition around the outer surface of each region of the plurality of end rings outside the air gap, wherein the plurality of collars radially extends beyond an outer diameter of the air gap; and
    maintaining a compressive stress in the plurality of end rings at a maximum-designed rotational speed of the rotor with the plurality of collars.

11. The method according to claim 10, wherein the rotor further comprises a plurality of conductors disposed within the rotor core and connected to the plurality of end rings, the method further comprising:
    applying a centrifugal force with the plurality of conductors to the plurality of end rings while the rotor is rotating.

12. The method according to claim 11, further comprising:
    maintaining the outer surface of each of the plurality of end rings at a constant outer diameter while the rotor is rotating by containing the centrifugal force of the plurality of conductors with the plurality of collars.

13. The method according to claim 10, further comprising:
    reducing a tensile stress in the plurality of end rings while the rotor is rotating using the plurality of collars to sustain a hoop stress in the plurality of end rings.

14. The method according to claim 10, wherein the induction motor is part of a vehicle.

15. A method for fabricating an induction motor comprising:
    attaching a plurality of end rings at opposite ends of a rotor core of a rotor, wherein each of the plurality of end rings has one of a plurality of regions, and each of the plurality of regions has an outer surface;
    inserting the rotor inside a stator and separated from the stator by an air gap such that each of the plurality of regions is disposed outside of the air gap, wherein the outer surface of each of the plurality of end rings is aligned with an inner diameter of the air gap, the stator is configured to generate a rotating magnetic field, and the rotor is rotatable around an axis in response to the rotating magnetic field; and attaching a plurality of collars in a prestressed condition around the outer surface of each of the plurality of regions outside the air gap while the rotor is inside the stator, wherein the prestressed condition is configured to maintain a compressive stress in the plurality of end rings at a maximum-designed rotational speed of the rotor, and the plurality of collars radially extends beyond an outer diameter of the air gap.

16. The method according to claim 15, further comprising:

disposing plurality of conductors within the rotor core; and connecting the plurality of conductors to the plurality of end rings, wherein the plurality of conductors applies a centrifugal force to the plurality of end rings while the rotor is rotating.

17. The method according to claim 16, further comprising:

creating the prestressed condition by interference fitting the plurality of collars to the plurality of end rings.

18. The method according to claim 17, wherein the interference fitting is a press fitting of the plurality of collars around the plurality of end rings.

19. The method according to claim 17, wherein the interference fitting comprises:

heating the plurality of collars;

positioning the plurality of collars around the plurality of end rings; and cooling the plurality of collars.

20. The method according to claim 17, wherein the interference fitting comprises:

cooling the plurality of end rings;

positioning the plurality of collars around the plurality of end rings; and warming the plurality of collars.

\* \* \* \* \*